Patented June 24, 1952

2,601,572

UNITED STATES PATENT OFFICE 2,601,572

POLYMERIZABLE COMPOSITIONS, INCLUDING 4 - ALLYLOXYMETHYL- 1,3 - DIOXOLANE AND POLYMERIZATION PRODUCTS THEREOF

Walter M. Thomas, Springdale, and Edward L. Kropa, Old Greenwich, Conn., assignors to American Cyanamid Company, New York, N. Y., a corporation of Maine No Drawing. Application August 10, 1950, Serial No. 178,756

13 Claims. (Cl. 260—85.5)

This application is a continuation-in-part of our copending application Serial No. 106,974, filed July 26, 1949, now Patent No. 2,578,861, issued December 18, 1951.

This invention relates to new polymerizable compositions, to polymerization products prepared therefrom and to methods of preparing such products. More particularly the present invention is directed to polymerizable compositions comprising (1) 4-allyl-oxymethyl-1,3-dioxolane and (2) a compound which is different from the compound of (1), which is copolymerizable therewith and which contains a $CH_2=C<$ grouping, e. g., styrene, acrylonitrile, ethyl acrylate, methyl methacrylate, etc., and to compositions comprising a copolymer of copolymerizable ingredients including as essential components the aforementioned compounds of (1) and (2). The scope of the invention also includes method features.

Many different vinyl and allyl compounds were known prior to our invention, but to the best of our knowledge and belief 4-allyloxymethyl-1,3-dioxolane has not previously been prepared or used as a comonomer in the production of copolymers. The compound is unique in that it can be caused to polymerize either through its ethylenically unsaturated bond or through both the unsaturated linkage and the dioxolane ring. By suitable choice of catalysts, polymerization can be caused to take place primarily through the ring. Because of its unique structure and properties, the plastics chemist and resin formulator, and workers in related arts are provided with a single polymerizable material which, alone or preferably while admixed with another comonomer, can be caused to undergo either or both of two types of polymerization reactions as briefly described above. The advantages of such a polymerizable compound will be apparent to those skilled in the art, for example, the greater adaptability of such compounds for a greater variety of service applications by merely varying the catalyst or other polymerization influences employed, or the temperature or other polymerization conditions used, so as to direct the course of the polymerization through the ethylenic linkage and/or the dioxolane grouping as desired or as conditions may require.

As indicated above, 4-allyloxymethyl-1,3-dioxolane is preferably caused to polymerize while admixed with one or more (e. g., two, three, five, ten, or any desired number) of other comonomers which are copolymerizable therewith, more particularly such comonomers which contain a $CH_2=C<$ grouping (that is, comonomers which contain either a single $CH_2=C<$ grouping or a plurality of such groupings), thereby to obtain copolymers, which in general are resinous or potentially resinous materials and which are especially valuable for use in the plastics, coating, laminating, adhesive, molding and other arts. Examples of comonomers with which this unsaturated dioxolane can be copolymerized are vinyl compounds, more particularly vinyl aromatic compounds (e. g., styrene, dimethyl styrene, divinyl benzene and other vinyl aromatic hydrocarbons) and vinyl aliphatic compounds, for instance acrylonitrile, acrylamide, the alkyl esters of acrylic acid (e. g., methyl, ethyl, propyl, etc., acrylates), the various allyl esters, e. g., allyl acetate, diallyl phthalate, diallyl succinate, etc.

It is an object of the present invention to provide a new class of polymerizable compositions containing 4-allyloxymethyl-1,3-dioxolane and one or more other comonomers copolymerizable therewith, and a new class of copolymer compositions from the said polymerizable compositions.

Another object of the invention is to provide a new class of synthetic compositions, more particularly resinous copolymers, which are especially suitable for use in the plastics, coating, adhesive, laminating, molding and other arts.

Other objects of the invention will be apparent to those skilled in the art from the following more detailed description thereof.

In producing the polymerization products of our invention, 4-allyloxymethyl-1,3-dioxolane is preferably polymerized while admixed with a comonomer (or a plurality of comonomers) containing one or more $CH_2=C<$ groupings since, in general, products having optimum properties for a particular service use thereby can be obtained at minimum cost. Heat, light or heat and light can be used to effect polymerization, although under such conditions the rate of polymerization is relatively slow. Hence, to accelerate the polymerization, we prefer to use a polymerization catalyst accompanied by heat, light or heat and light. Further details on polymerization conditions are given hereinafter.

Examples of monomers containing a $CH_2=<$ grouping that can be copolymerized with the aforementioned unsaturated dioxolane, either singly or a plurality (two, three, four or any desired number) thereof, the latter often being desirable in order to improve the compatibility and copolymerization characteristics of the mixture of monomers and to obtain new and valuable copolymers having the particular properties desired for a particular service application, are such monomers as the unsaturated alcohol esters, more particularly the allyl, methallyl, crotyl, 1-chloroallyl, 2-chloroallyl, cinnamyl, vinyl, methvinyl, 1-phenylallyl, butenyl, etc., esters of saturated and unsaturated, aliphatic and aromatic, monobasic and polybasic acids such, for instance, as acetic, propionic, butyric, valeric, caproic, acrylic and alpha-substituted acrylic (including alkacrylic, e. g., methacrylic, ethacrylic, propacrylic, etc., and arylacrylic, e. g., phenylacrylic, etc.), crotonic, oxalic, malonic, succinic, glutaric, adipic, pimelic, suberic, azelaic, sebacic, maleic, fumaric, citraconic, mesaconic, itaconic, acetylene dicarboxylic, aconitic, benzoic, phenylacetic, phthalic, terephthalic, benzoylphthalic, etc., acids; the saturated monohydric alcohol esters, e. g., the methyl, ethyl, propyl, isopropyl, butyl, sec.-butyl, amyl, etc., esters of unsaturated aliphatic monobasic and polybasic acids, illustrative examples of which appear above; vinyl cyclic compounds (including monovinyl aromatic hydrocarbons), e. g., styrene, o-, m- and p-chlorostyrenes, -bromostyrenes, -fluorostyrenes, -methylstyrenes, -ethylstyrenes, -cyanostyrenes, the various poly-substituted styrenes such, for example, as the various di-, tri- and tetra-chlorostyrenes, -bromostyrenes, -fluorostyrenes, -methylstyrenes, -ethylstyrenes, -cyanostyrenes, etc., vinyl naphthalene, vinylcyclohexane, vinyl furane, vinyl pyridine, vinyldibenzofuran, divinyl benzene, trivinyl benzene, allyl benzene, diallyl benzene, N-vinyl carbazole, the various allyl cyanostyrenes, the various alpha-substituted styrenes and alpha-substituted ring-substituted styrenes, e. g., alpha-methyl styrene, alpha-methyl-para-methyl styrene, etc.; unsaturated ethers, e. g., ethyl vinyl ether, diallyl ether, ethyl methallyl ether, etc.; unsaturated amides, for instance N-allyl caprolactam, acrylamide, and N-substituted acrylamides, e. g., N-methylol acrylamide, N-allyl acrylamide, N-methyl acrylamide, N-phenyl acrylamide, etc.; unsaturated ketones, e. g., methyl vinyl ketone, methyl allyl ketone, etc.; methylene malonic esters, e. g., methylene methyl malonate, etc.; butadienes, e. g., 1,3-butadiene, 2-chlorobutadiene, etc.; unsaturated polyhydric alcohol (e. g., butenediol, etc.) esters of saturated and unsaturated, aliphatic and aromatic, monobasic and polybasic acids, illustrative examples of which appear above.

Other examples of monomers that can be copolymerized with 4-allyloxymethyl-1,3-dioxolane are the vinyl halides, more particularly vinyl fluoride, vinyl chloride, vinyl bromide and vinyl iodide, and the various vinylidene compounds, including the vinylidene halides, e. g., vinylidene chloride, vinylidene bromide, vinylidene fluoride and vinylidene iodide, other comonomers being added if needed in order to improve the compatibility and copolymerization characteristics of the mixed monomers.

Other and more specific examples of monomeric materials which may be mixed or blended with the unsaturated dioxolane used in practicing our invention and the resulting homogeneous or substantially homogeneous, polymerizable composition then polymerized, as hereinafter more fully described, to yield new and valuable copolymer compositions are the allyl compounds which are different from the allyl compound embraced by Formula I and especially those which have a boiling point of at least about 60° C. Of the monomeric materials which may be used the allyl esters form a large class, all of which are suitable. The reactive allyl compounds employed are preferably those which have a high boiling point such, for example, as diallyl maleate, diallyl fumarate, diallyl phthalate, diallyl succinate, etc. Other allyl compounds which are not necessarily high boiling also may be used.

More specific examples of allyl compounds that can be copolymerized with 4-allyloxymethyl-1,3-dioxolane are allyl alcohol, methallyl alcohol, allyl acetate, allyl methacrylate, diallyl carbonate, allyl lactate, allyl alpha-hydroxyisobutyrate, allyl trichlorosilane, allyl acrylate, diallyl malonate, diallyl oxalate, diallyl gluconate, diallyl methylgluconate, diallyl adipate, diallyl azelate, diallyl sebacate, diallyl tartronate, diallyl tartrate, diallyl mesaconate, diallyl citraconate, the diallyl ester of muconic acid, diallyl itaconate, diallyl chlorophthalate, diallyl dichlorosilane, the diallyl ester of endomethylene tetrahydrophthalic anhydride, triallyl tricarballylate, triallyl aconitate, triallyl cyanurate, triallyl citrate, triallyl phosphate, trimethallyl phosphate, tetrallyl silane, tetrallyl silicate, hexallyl disiloxane, etc. Other examples of allyl compounds that may be employed are given, for example, in Kropa Patent No. 2,510,503, issued June 6, 1950.

Among the comonomers which are preferred for use in carrying our invention into effect are the vinyl compounds, including the vinyl aromatic compounds, more particularly the vinyl aromatic hydrocarbons (e. g., styrene, isopropenyl toluene, the various dialkyl styrenes, etc.), and the vinyl aliphatic compounds, e. g., acrylonitrile, acrylamide, etc., and other compounds containing a $CH_2=C<$ grouping, e. g., the various substituted acrylonitriles (e. g., methacrylonitrile, ethacrylonitrile, phenylacrylonitrile, etc.), the various substituted acrylamides (e. g., methacrylamide, ethacrylamide, the various N-substituted acrylamides and alkacrylamides, for instance N-methylol acrylamide, N-monoalkyl and -dialkyl acrylamides and methacrylamides, e. g., N-monomethyl, -ethyl, -propyl, -butyl, etc., and N-dimethyl, -ethyl, -propyl, -butyl, etc., acrylamides and methacrylamides, N-monoaryl and -diaryl acrylamides and alkacrylamides, e. g., N-monophenyl and -diphenyl acrylamides and methacrylamides, etc.), vinyl esters, e. g., vinyl acetate, vinyl propionate, vinyl butyrate, vinyl isobutyrate, vinyl valerate, vinyl acrylate, vinyl methacrylate, etc., esters of an acrylic acid (including acrylic acid itself and the various alpha-substituted acrylic acids, e. g., methacrylic acid, ethacrylic acid, phenylacrylic acid, etc.), more particularly the alkyl esters of an acrylic acid, e. g., the methyl, ethyl, propyl, isopropyl, n-butyl, isobutyl, sec.-butyl, tert.-butyl, amyl, hexyl, heptyl, octyl, decyl, dodecyl, etc., esters of acrylic, methacrylic, ethacrylic, phenylacrylic, etc., acids, including the alkyl acrylates containing not more than four carbon atoms in the ester grouping, examples of which are given above, as well as other vinyl aromatic and vinyl aliphatic compounds, and other compounds containing a $CH_2=C<$ grouping.

Any suitable means may be used in effecting polymerization of a polymerizable composition containing 4-allyloxymethyl-1,3-dioxolane and one or more other monomers which are copolymerizable therewith. Heat or light or both, with or without a polymerization catalyst, can be used. Ultraviolet light is more effective than ordinary light. Preferably a polymerization catalyst is employed. Any of the catalysts which are useful in accelerating the polymerization of compounds containing an ethylenically unsaturated grouping, specifically a vinyl grouping, can be used. Among the preferred catalysts are: the acidic peroxides, e. g., benzoyl peroxide, phthalic peroxide, succinic peroxide and benzoyl acetic peroxide, as well as fatty oil acid peroxides, e. g., coconut oil acid peroxides, lauric peroxide, stearic peroxide and oleic peroxide; alcoholic peroxides, e. g., tert.-butyl hydroperoxide; and terpene oxides, e. g., ascaridole. Other examples of organic peroxide catalysts that can be employed are the following:

Tetralin hydroperoxide
Tert.-butyl diperphthalate
Cumene hydroperoxide
Tert.-butyl perbenzoate
Acetyl peroxide
2,4-dichlorobenzoyl peroxide
Urea peroxide
Caprylyl peroxide
p-Chlorobenzoyl peroxide
2,2-bis(di-tert.-butyl peroxy) butane
Hydroxyheptyl peroxide
Diperoxide of benzaldehyde Examples of catalysts which are believed to accelerate polymerization primarily by opening up the dioxolane ring and, also, may cause polymerization to proceed through the ethylenically unsaturated grouping are: p-toluene sulfonic acid, sulfuric acid, phosphoric acid, aluminum chloride, stannic chloride, ferric chloride, boron trifluoride-ethyl ether complex, iodine, etc. Certain alkaline catalysts also seem to function in a similar manner, e. g., ethylene diamine, tetraethylenepentamine, etc.

Catalysts which accelerate polymerization as the result of the liberation of a free radical, e. g., sym-dicyanotetramethylazomethane and similar known diazo polymerization catalysts, also can be employed.

If desired, partial polymerization of the unsaturated dioxolane can be effected with the aid of one polymerization catalyst (e. g., a peroxide and, more particularly, an organic peroxide catalyst, or with a diazo or other type of catalyst capable of liberating a free radical) and polymerization then completed with the aid of a catalyst capable of opening up the dioxolane ring, e. g., stannic chloride, etc.

The concentration of catalyst is relatively small, e. g., from, by weight, about 1 part of catalyst per thousand parts of the mixture of monomers to be polymerized to about 3 or 4 or more parts of catalyst per hundred parts of the monomer or mixture of monomers. If an inhibitor be present in the polymerizable composition, up to 6 or 7% or even more, based on the weight of the said composition, may be necessary (according to the concentration of the inhibitor) in order to overcome the effect of the inhibitor and to cause polymerization to proceed as desired within a reasonable period of time.

The proportions of 4-allyloxymethyl-1,3-dioxolane and monomeric material which is copolymerized therewith may be widely varied, but ordinarily the proportions thereof in the polymerizable mixture will be within the range of, by weight, from 3 (about 3) to 97 (about 97), or higher, molar percent of the unsaturated dioxolane to from 97 (about 97) to 3 (about 3), or lower, molar percent of the other comonomer. Preferably the unsaturated dioxolane constitutes at least 5 molar percent of the mixture thereof with the other comonomer or mixture of comonomers. When the comonomer constitutes only about 3 molar percent by weight of the polymerizable composition and the unsaturated dioxolane constitutes the remainder, the changes in the properties of the polymerization product are less marked (as compared with the homopolymeric dioxolane) than when the comonomer (or mixture of comonomers) constitutes a substantially larger amount, as for example 10 or 20 molar percent or even as much as 30 or 40 molar percent of the polymerizable composition. Particularly valuable copolymer compositions are obtained by using, by weight, from 10 to 50 molar percent of the unsaturated dioxolane and from 90 to 50 molar percent of a comonomer (or mixture of comonomers) which is copolymerizable therewith and which contains a $CH_2=C<$ grouping, numerous examples of which have been given hereinbefore.

In some cases it may be desirable to incorporate into the polymerizable composition (especially those comprising the unsaturated dioxolane and one or more comonomers) an inhibitor which is adapted to inhibit polymerization through the ethylenically unsaturated grouping of the monomeric material. When it is desired to use the inhibitor-modified composition, a catalyst is added in an amount sufficient to promote the polymerization reaction. Various inhibitors can be used for this purpose, e. g., phenyl-$\alpha$-naphthylamine, N,N'-di-2-naphthyl-p-phenylenediamine, certain cupric salts, e. g., cupric acetate, etc. The amount of inhibitor may be considerably varied but ordinarily it is employed in an amount not exceeding 3%, generally less than 1%, by weight of the polymerizable composition, e. g., from 0.01% to 0.5% or 0.6% by weight of the said composition.

The polymerization may be effected by conventional bulk polymerization technique, in the presence or absence of a solvent capable of dissolving the monomers and in which the latter preferably is inert; or by conventional emulsion polymerization or bead polymerization methods. Polymerization of the mixture of monomers may be effected by a continuous process as well as by a batch operation. Thus, the mixture of unsaturated dioxolane and one or more other comonomers, to which has been added a small amount of suitable polymerization catalyst, may be caused to polymerize to yield a copolymer or interpolymer by passage through a conduit with alternate hot and cool zones.

The temperature of polymerization of the polymerizable composition, at atmospheric or slightly above atmospheric pressure and in the presence or absence of a polymerization catalyst, may be varied over a wide range, up to and including or slightly above the boiling point at atmospheric pressure of the mixture of monomers. In most cases the polymerization temperature will be within the range of 15° to 200° C., more particularly within the range of 20° C. or 30° C. (ordinary room temperature) to 130°–140° C., depending, for example, upon the rapidity of copolymerization wanted, the particular catalyst, if any, used, the particular mixture of comonomers employed when a particular copolymer is wanted, and other influencing factors. With certain polymerization catalysts, more particularly strong acidic polymerization catalysts such, for instance, as gaseous boron trifluoride, boron trifluoride-ethyl ether complex, concentrated sulfuric acid, anhydrous aluminum chloride, etc., a substantially lower polymerization temperature often advantageously can be used, e. g., temperatures ranging between −80° C. and 0° or 10° C. At the lower temperatures below the solidification point of the monomeric composition, polymerization of the said composition is effected while it is dissolved or dispersed in a solvent or dispersion medium which is liquid at the polymerization temperature. Or, if desired, the monomeric composition may be polymerized in dissolved or dispersed state at temperatures above its solidification point or above the solidification point of copolymerizable components thereof. The copolymer may be separated from the liquid medium in which copolymerization was effected by any suitable means, e. g., by filtration, centrifuging, solvent extraction, etc.

The polymerizable compositions of our invention which are normally liquids may be cast at normal temperatures in film or bulk form. Upon being subjected to polymerization conditions as above described, hard films or massive castings are obtained.

In order that those skilled in the art better may understand how the present invention can be carried into effect, the following examples are given by way of illustration and not by way of limitation. All parts and percentages are by weight.

EXAMPLE 1

This example illustrates the preparation of 4-allyloxymethyl-1,3-dioxolane, the formula for which is

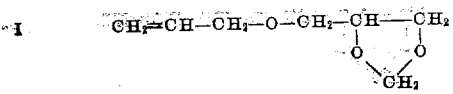

|  | Parts | Approx. Molar Ratios |
|---|---|---|
| Glycerol-α-allyl ether | 132.0 | 1.0 |
| Aqueous solution of formaldehyde (approx. 37% HCHO) | 90.0 | 1.1 |
| Phosphoric acid (approx. 85% H₃PO₄) | 6.0 | |

A mixture of the above ingredients is heated under reflux at the boiling temperature of the mass for 1 hour. After distilling off the water and excess formaldehyde from the resulting reaction mass, the residue is neutralized with triethanolamine and thereafter washed with water. Distillation is continued until no more distillate is obtained at a bath temperature of 175° C. The distillate is shaken with CaCl₂ and redistilled under reduced pressure. 4-allyloxymethyl-1,3-dioxolane is collected as the product boiling at 82°–85° C. under a pressure of 15 mm. in a yield amounting to about 29%. It is a clear, mobile, colorless liquid; $n_D^{25°}$ 1.4401.

EXAMPLE 2

| | Parts |
|---|---|
| 4-allyloxymethyl-1,3-dioxolane | 10.0 |
| Ethyl acrylate | 10.0 |
| Benzene | 20.0 |
| Benzoyl peroxide | 0.2 | are heated together under reflux at the boiling temperature of the mass for 5 hours. The resulting viscous solution containing a copolymer of ethyl acrylate and the aforementioned dioxolane is cooled, and the content of copolymer solids is determined by oven-drying for 2 hours at 150° C. The yield of copolymer solids is 36.6%, which corresponds to 73.2% conversion of monomers to copolymer. Films dried from the benzene solution of the copolymer are clear and tough. The copolymer of this example is suitable for use as a component of coating compositions.

Instead of ethyl acrylate other comonomers, more particularly other esters of acrylic acid, e. g., methyl acrylate, propyl acrylate, isopropyl acrylate, n-butyl acrylate, isobutyl acrylate, sec.-butyl acrylate, tert.-butyl acrylate, amyl acrylate, hexyl acrylate, propenyl acrylate, cyclohexyl acrylate, phenyl acrylate, benzyl acrylate, etc., can be substituted in the above formulation thereby to obtain copolymer compositions of varying properties. As with ethyl acrylate, so too with such other comonomers the proportions of components can be varied as desired or as conditions may require, e. g., from 3 to 97 (or higher) molar percent of the dioxolane to from 97 to 3 (or lower) molar percent of the other comonomer. Preferably the comonomer constitutes from 5–10 to 95–90 molar percent of the mixture thereof with the dioxolane.

EXAMPLE 3

| | Parts |
|---|---|
| Styrene | 180.0 |
| 4-allyloxymethyl-1,3-dioxolane | 20.0 |
| 25% solution of dioctyl sodium sulfosuccinate in water | 20.0 |
| Water | 580.0 |
| Ammonium persulfate | 0.1 | are charged to a 3-necked reaction vessel equipped with a stirrer and a reflux condenser. The mixture is stirred vigorously while heating on a steam bath for 90 minutes, at the end of which period refluxing has ceased. Steam is now passed through the emulsion for 15 minutes to remove residual monomers. A small amount of coagulated copolymer is filtered out of the stable emulsion of the copolymer of styrene and the aforementioned unsaturated dioxolane.

The copolymer latex may be used as a coating composition or as a component of such compositions. For example, it may be applied to a surface of glass, metal, wood or other material to be protectively finished, and the coated article then heated for from 1 to 3 hours at a temperature of the order of 120° C. to 140° C. to evaporate the water and to convert the reactive styrene-unsaturated dioxolane copolymer to a cured or substantially insoluble, substantially infusible state.

The copolymer may be precipitated, if desired, from the aqueous emulsion thereof by adding a coagulating agent such, for instance, as salts (e. g., salts of polyvalent metals such as aluminum sulfate, magnesium chloride, barium chloride, etc., salts of monovalent metals such as sodium chloride, sodium sulfate, etc.), acids, e. g., formic acid, acetic acid, phosphoric acid, hydrochloric acid, etc., sulfides, e. g., magnesium sulfide, etc. The coagulated copolymer is separated from the aqueous phase, water-washed, and freed from entrapped water, for example by working on rolls to press out the water, followed by drying at a suitable temperature (e. g., at room temperature) under atmospheric pressure (preferably in a stream of dry air) or at subatmospheric pressures to remove the last traces of water. The dried, reactive copolymer, alone or with a dye, pigment, filler, plasticizer, lubricant, polymerization catalyst or other modifying agent, may be molded under heat and pressure, e. g., at 140° C. to 170° C. and under a pressure of 2000 to 5000 pounds per square inch.

EXAMPLE 4

|   | Parts |
|---|---|
| Acrylonitrile | 25.0 |
| 4-allyloxymethyl-1,3-dioxolane | 25.0 |
| Benzene | 50.0 |
| Benzoyl peroxide | 0.5 | are heated together under reflux at the boiling temperature of the mass for 5 hours. From the resulting mass a solid copolymer of acrylonitrile and 4-allyloxymethyl-1,3-dioxolane can be isolated by evaporating or distilling off the benzene.

EXAMPLE 5

|   | Parts |
|---|---|
| Ethyl acrylate | 90 |
| 4-allyloxymethyl-1,3-dioxolane | 10 | are dissolved together, and the resulting solution is then added to

|   | Parts |
|---|---|
| Sodium lauryl sulfate | 1.5 |
| Ammonium persulfate | 0.5 |
| Deionized water | 300.0 |

The resulting mixture is heated with stirring in a reaction vessel placed on a steam bath for 1½ hours, after which stirring is stopped, and steam is passed rapidly through the mass for 15 minutes in order to remove unreacted monomers. The steamed emulsion is cooled and strained to remove lumps of coagulated copolymer. A portion of the emulsion is diluted with water to 10% solids and is used to impregnate woolen fabrics. The impregnated cloth is dried for 10 minutes at 300° F. and is tested for shrinkage after being given five successive standard washings in a soap solution. The treated wool shrinks about 10%, whereas the untreated wool shrinks about 17%.

Similar results are obtained when 5 parts of 4-allyl-1,3-dioxolane and 5 parts of 4-allyloxymethyl-1,3-dioxolane are substituted for 10 parts of 4-allyloxymethyl-1,3-dioxolane in the above formula.

EXAMPLE 6

|   | Parts |
|---|---|
| Methyl acrylate | 45.0 |
| Ethyl acrylate | 45.0 |
| 4-allyloxymethyl-1,3-dioxolane | 10.0 |
| 25% solution of dioctyl sodium sulfosuccinate in water | 20.0 |
| Water | 380.0 |
| 30% aqueous solution of hydrogen peroxide | 1.1 |

The same general procedure is followed as described under Example 3. Stirring and heating under reflux are continued for 5 hours, after which the emulsion is steamed for 1 hour to remove unpolymerized monomers. The resulting product is a fairly stable emulsion of reactive copolymer, which may be used, for example, as a coating composition or as a component of such compositions.

EXAMPLE 7

|   | Parts |
|---|---|
| Methyl methacrylate | 50 |
| 4-allyloxymethyl-1,3-dioxolane | 50 |
| Benzoyl peroxide | 1 | are mixed together and charged to a heavy-walled glass tube, which thereafter is sealed under vacuum. Copolymerization is effected by heating the sealed tube in a 60° C. water bath for 24 hours. A hard copolymer of methyl methacrylate and 4-allyloxymethyl-1,3-dioxolane is obtained.

EXAMPLE 8

|   | Parts |
|---|---|
| Ethyl acrylate | 10.0 |
| 4-allyloxymethyl-1,3-dioxolane | 10.0 |
| Toluene | 20.0 |
| Benzoyl peroxide | 0.2 | are heated together under reflux at the boiling temperature of the mass for 5 hours. The yield of copolymer solids is 28.6%, which corresponds to 57.2% conversion of monomers to copolymer. Clear films are obtained by casting the solution on glass plates and baking as described in the preceding example.

EXAMPLE 9

|   | Parts |
|---|---|
| 4-allyloxymethyl-1,3-dioxolane | 10.0 |
| Styrene | 10.0 |
| Xylene | 20.0 |
| 2,2-bis(di-tert.-butyl peroxy) butane | 0.2 | are heated together under reflux at the boiling temperature of the mass for 5 hours, yielding a homogeneous, slightly viscous solution of the copolymer of the unsaturated dioxolane and styrene. Films dried from the xylene solution are clear and tough. Their solvent resistance can be increased by incorporating a small amount, e. g., from 1 to 5% by weight of the copolymer solids, of a polyamine such, for instance, as ethylene diamine, tetraethylenepentamine, etc., into the copolymer solution prior to drying.

EXAMPLE 10

|   | Parts |
|---|---|
| Acrylonitrile | 100.0 |
| 4-allyloxymethyl-1,3-dioxolane | 100.0 |
| 25% solution of dioctyl sodium sulfosuccinate | 24.4 |
| Water | 574.0 |
| 30% aqueous solution of hydrogen peroxide | 4.4 |

All of the above ingredients with the exception of one-half (2.2 parts) of the aqueous hydrogen peroxide solution are charged to a reaction vessel as described under Example 3. The mixture is stirred vigorously while heating under reflux on a steam bath for 1½ hours, after which the remainder (2.2 parts) of the aqueous hydrogen peroxide solution is added to the reaction mass. Heating is continued under reflux for an additional 1½ hours, after which steam is passed through the emulsion for 15 to 20 minutes to remove residual monomers.

The emulsion is filtered and then frozen in a bath of acetone and Dry Ice (solid carbon dioxide). About 60 parts of concentrated hydrochloric acid is added to the emulsion, which is then filtered to isolate the copolymer. The filter cake of copolymer is washed with water and dried in a vacuum oven at 50° C. for 48 hours, yielding a dried, reactive copolymer of acrylonitrile and 4-allyloxymethyl-1,3-dioxolane. This reactive copolymer, alone or admixed with a filler, polymerization catalyst or other additive, is adapted to be molded under heat and pressure to yield molded articles of various shapes.

EXAMPLE 11

This example illustrates the production of copolymers of acrylonitrile and 4-allyloxymethyl-1,3-dioxolane, using from 5 to 95 molar percent of the one to from 95 to 5 molar percent of the other, and benzoyl peroxide as a catalyst for the copolymerization reaction. The ingredients were mixed together and charged to heavy-walled glass tubes, which thereafter were evacuated and sealed under vacuum. Copolymerization was effected by heating the sealed tubes in a 60° C. water bath for 120 hours. The proportions used and results obtained are tabulated below:

Table

| 4-Allyloxymethyl-1,3-dioxolane | | Acrylonitrile | | Benzoyl Peroxide Parts | Appearance of Copolymerization Product |
|---|---|---|---|---|---|
| Mole per cent | Parts | Mole per cent | Parts | | |
| 5 | 1.1 | 95 | 8.9 | 0.1 | Product comprised mainly a white, granular solid. Some brownish, rubbery solid also was present. |
| 10 | 2.1 | 90 | 7.9 | 0.1 | Do. |
| 50 | 7.1 | 50 | 2.9 | 0.1 | Product comprised mainly a homogeneous, brown, rubbery solid. |
| 95 | 4.9 | 5 | 0.1 | 0.1 | The copolymer was obtained as a somewhat viscous, brownish liquid. |

It will be understood, of course, by those skilled in the art that our invention is not limited to the specific ingredients named in the above illustrative examples nor to the particular proportions and methods of polymerization and copolymerization mentioned therein. Thus, instead of benzoyl peroxide and the other catalysts named in the different examples, any other polymerization catalyst or combination of polymerization catalysts, numerous examples of which have been given hereinbefore, may be used. Other catalysts that can be employed are other salts of per-acids, e. g., sodium and potassium persulfates, sodium and potassium percarbonates, sodium and potassium perborates, sodium and potassium perphosphates, etc. Also, instead of using 4-allyloxymethyl-1,3-dioxolane and the other comonomer or comonomers in the particular proportions given in the various examples, they can be used in other proportions, for instance in the proportions mentioned by way of illustration in the portion of the specification prior to the examples, and also under Example 2 with particular reference to acrylate comonomers.

A comonomer (or plurality of comonomers) which contains one or more $CH_2=C<$ groupings, which is different from the unsaturated dioxolane and which is compatible and copolymerizable therewith, other than the particular comonomers given in the above illustrative examples, also can be used. For instance, the comonomer may be a cyanoalkyl ester of an acrylic acid, e. g., mono-, di-, and tricyanomethyl esters of acrylic acid, methacrylic acid, etc., the mono-, di- and tri-($\beta$-cyanoethyl) esters of acrylic acid, methacrylic acid, etc. Or, the comonomer can be any other organic compound which is copolymerizable with the unsaturated dioxolane and which is represented by the general formula II
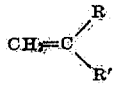

where R represents a member of the class consisting of hydrogen, halogen (chlorine, fluorine, bromine or iodine), alkyl (e. g., methyl, ethyl, propyl, butyl to octadecyl, inclusive), cycloalkyl (e. g., cyclohexyl, etc.), aryl (e. g., phenyl, xenyl, naphthyl, etc.), alkaryl (e. g., tolyl, xylyl, ethylphenyl, etc.), aralkyl (e. g., benzyl, phenylethyl, etc.) and R' represents an aryl radical or a radical represented by the formula

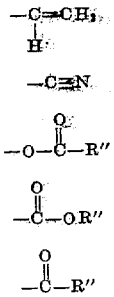

where R" represents an alkyl, alkoxyalkyl (e. g., methoxymethyl, methoxyethyl, ethoxyethyl, ethoxypropyl, propoxybutyl, etc.) or a carbocyclic radical (e. g., aryl, alkaryl, hydroaromatic, etc.). Examples of compounds embraced by Formula II are the vinyl esters (e. g., vinyl acetate, etc.), methyl vinyl ketone, isoprene, 1,3-butadiene, 2-chloro-1,3-butadiene, acrylonitrile various esters of acrylic acid (e. g., methyl acrylate, ethyl acrylate, cyclohexyl acrylate, tetrahydronaphthyl acrylate, decahydronaphthyl acrylate, methoxyethyl acrylate, ethoxyethyl acrylate, etc.), as well as others that will be obvious to those skilled in the art.

The thermosetting or potentially thermosetting, reactive polymerization products (polymers and copolymers) of this invention have a wide variety of applications. For instance, with or without a filler or other additive, numerous examples of which have been hereinbefore, they may be used as molding compositions (or as components of molding compositions) from which molded articles are produced by molding the composition under heat and pressure, e. g., at temperatures of the order of 120° to 200° C. and under pressures ranging between 1000 and 10,000 pounds per square inch. Among the fillers that can be employed in the production of molding compositions are alpha-cellulose pulp, asbestos fibers, cotton flock, chopped cloth cuttings, glass fibers, wood flour, antimony oxide, titanium dioxide, sand, clay, mica dust, diatomaceous earth, etc.

The liquid polymerizable compositions of our invention also can be used in the production of castings; as adhesives, for instance in the production of optical devices containing a plurality of elements, examples of which are compound lenses, compound prisms, Nicol prisms, etc.; in the treatment of paper or paper stock; and for various other purposes.

We claim:
1. A polymerizable composition comprising (1) 4-allyloxymethyl-1,3-dioxolane and (2) a compound which is copolymerizable with the compound of (1) and which is represented by the general formula

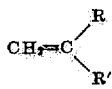

where R represents a member of the class consisting of hydrogen, halogen, and alkyl, cycloalkyl, aryl, alkaryl and aralkyl radicals, and R' represents a radical of the class consisting of an aryl radical and radicals represented by the formulas (a) $-\underset{H}{C}=CH_2$ (b) $-C\equiv N$ (c) $-O-\underset{\underset{O}{\|}}{C}-R''$ (d) $-\underset{\underset{O}{\|}}{C}-OR''$ (e) $-\underset{\underset{O}{\|}}{C}-R''$ where R'' represents a radical of the class consisting of alkyl, alkoxyalkyl and carbocyclic radicals, the ingredients of (1) and (2) being present in the said polymerizable composition in the ratio of from 3 to 97 molar percent of the former to form 97 to 3 molar percent of the latter.

2. A polymerizable composition as in claim 1 wherein R in the formula for the compound of (2) is hydrogen.

3. A polymerizable composition as in claim 1 wherein the compound of (2) is acrylonitrile.

4. A composition comprising a copolymer of copolymerizable ingredients including (1) 4-allyloxymethyl-1,3-dioxolane and (2) a compound which is copolymerizable with the compound of (1) and which is represented by the general formula

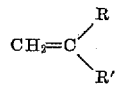

where R represents a member of the class consisting of hydrogen, halogen, and alkyl, cycloalkyl, aryl, alkaryl and aralkyl radicals, and R' represents a radical of the class consisting of an aryl radical and radicals represented by the formulas (a) $-\underset{H}{C}=CH_2$ (b) $-C\equiv N$ (c) $-O-\underset{\underset{O}{\|}}{C}-R''$ (d) $-\underset{\underset{O}{\|}}{C}-OR''$ (e) $-\underset{\underset{O}{\|}}{C}-R''$ where R'' represents a radical of the class consisting of alkyl, alkoxyalkyl and carbocyclic radicals, the ingredients of (1) and (2) being present in the polymerizable composition in the ratio of from 3 to 97 molar percent of the former to from 97 to 3 molar percent of the latter.

5. A composition as in claim 4 wherein R in the formula for the compound of (2) is hydrogen.

6. A composition as in claim 4 wherein the compound of (2) is acrylonitrile.

7. A composition as in claim 4 wherein the compound of (2) is an alkyl ester of acrylic acid.

8. A composition as in claim 7 wherein the alkyl ester of acrylic acid is ethyl acrylate.

9. A composition as in claim 4 wherein the compound of (2) is an alkyl ester of methacrylic acid.

10. A composition as in claim 9 wherein the alkyl ester of methacrylic acid is methyl methacrylate.

11. The method of preparing a new synthetic composition which comprises polymerizing under heat, while admixed with a polymerization catalyst, a polymerizable composition comprising (1) 4-allyloxymethyl-1,3-dioxolane and (2) a compound which is copolymerizable with the compound of (1) and which is represented by the general formula

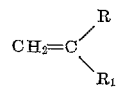

where R represents a member of the class consisting of hydrogen, halogen, and alkyl, cycloalkyl, aryl, alkaryl and aralkyl radicals, and R' represents a radical of the class consisting of an aryl radical and radicals represented by the formulas (a) $-\underset{H}{C}=CH_2$ (b) $-C\equiv N$ (c) $-O-\underset{\underset{O}{\|}}{C}-R''$ (d) $-\underset{\underset{O}{\|}}{C}-OR''$ (e) $-\underset{\underset{O}{\|}}{C}-R''$ where R'' represents a radical of the class consisting of alkyl, alkoxyalkyl and carbocyclic radicals, the ingredients of (1) and (2) being present in the said polymerizable composition in the ratio of from 3 to 97 molar percent of the former to from 97 to 3 molar percent of the latter.

12. A composition as in claim 4 wherein, in the formula for the compound of (2), R represents hydrogen and R' represents an aryl radical.

13. A composition as in claim 12 wherein R' represents a phenyl radical.

WALTER M. THOMAS.
EDWARD L. KROPA.

REFERENCES CITED

The following references are of record in the file of this patent:

UNITED STATES PATENTS

| Number | Name | Date |
|---|---|---|
| 2,098,108 | Reppe | Nov. 2, 1937 |